United States Patent [19]
Lubowitz et al.

[11] Patent Number: 5,817,738
[45] Date of Patent: Oct. 6, 1998

[54] CONDUCTIVE, MULTIDIMENSIONAL OLIGOMERS AND BLENDS

[75] Inventors: Hyman R. Lubowitz, Rolling Hills Estates, Calif.; Clyde H. Sheppard, Bellevue, Mass.; Larry P. Torre, Madison, Ala.

[73] Assignee: The Boeing Company, Seattle, Wash.

[21] Appl. No.: 212,404

[22] Filed: Jun. 27, 1988

Related U.S. Application Data

[63] Continuation-in-part of Ser. No. 773,381, Sep. 5, 1985, abandoned, which is a continuation-in-part of Ser. No. 726,258, Apr. 23, 1985, abandoned, and Ser. No. 726,259, Apr. 23, 1985, abandoned.

[51] Int. Cl.$^6$ .................................................. C08G 12/08
[52] U.S. Cl. .............. 528/171; 252/182.13; 252/182.17; 252/182.25; 252/511; 528/170; 528/173
[58] Field of Search ........................ 252/182.13, 182.17, 252/182.25, 511; 528/170, 171, 173

[56] References Cited

U.S. PATENT DOCUMENTS

| | | | |
|---|---|---|---|
| Re. 30,922 | 5/1982 | Heilman et al. ................... 528/170 X |
| 3,563,951 | 2/1971 | Radlmann et al. ........................ 528/26 |
| 3,761,441 | 9/1973 | D'Alessandro et al. ................. 523/157 |
| 3,772,250 | 11/1973 | Economy et al. ................... 528/173 X |
| 3,802,081 | 4/1974 | Lubowitz ............................. 528/172 X |
| 3,839,287 | 10/1974 | Kwiatkowski et al. . |
| 4,175,175 | 11/1979 | Johnson et al. ......................... 528/125 |
| 4,476,184 | 10/1984 | Lubowitz et al. .................. 427/350 X |
| 4,871,475 | 10/1989 | Lubowitz et al. .................. 528/170 X |
| 4,876,328 | 10/1989 | Lubowitz et al. .................. 528/173 X |
| 4,965,336 | 10/1990 | Lubowitz et al. ...................... 528/170 |
| 5,109,105 | 4/1992 | Lubowitz et al. ...................... 528/322 |
| 5,116,935 | 5/1992 | Lubowitz et al. ...................... 528/173 |

OTHER PUBLICATIONS

Elsenbaumer et al: Highly Conductive Meta Derivatives of Poly(Phenylene Sulfide), *J. Polymer Sci: Polymer Phys. Ed.*, vol. 20, 1781–1787 (1982).

Patel et al.: Poly–Schiff Bases, I. Preparation of Poly–Schiff Bases from 4,4'–Diacetyl Diphenyl Ether (DDE) With Various Diamines, *J. of Polymer Sci: Polymer Chem Ed.*, vol. 20, 1985–1992 (1982).

Walton: A New Network Polymer as an Electrical Conductor and Thermally Stable Plastic, *Am. Chem. Soc. Org. Coat Plast. Chem.*, vol. 42, 595–599 (1980).

*Primary Examiner*—Charles T. Jordan
*Attorney, Agent, or Firm*—John C. Hammar

[57] ABSTRACT

The morphology of multidimensional oligomers is combined with the inclusion of charge carrier linkages within the oligomer arms to produce oligomers that are useful for preparing conductive or semiconductive composites, if suitably doped. The Schiff base linkages are prepared by the condensation of aldehydes and amines. The oligomers can be blended, and either the oligomers or their blends can be prepregged.

25 Claims, No Drawings

CONDUCTIVE, MULTIDIMENSIONAL OLIGOMERS AND BLENDS

REFERENCE TO RELATED APPLICATIONS

This application is a continuation-in-part application based upon U.S. Ser. No. 773,381, filed Sep. 5, 1985, now abandoned, which was a continuation-in-part application based upon both U.S. Ser. No. 726,258, filed Apr. 23, 1985, now abandoned, and U.S. Ser. No. 726,259, also filed Apr. 23, 1985.

TECHNICAL FIELD

The present invention relates to a family of multidimensional oligomers that are useful for preparing conductive or semiconductive composites when suitably doped. Aromatic polymeric arms containing conductive linkages, such as —CH=N—, extend from a central aromatic hub and terminate with crosslinking end-cap groups. When the oligomer is cured, three-dimensional polymeric matrices are formed with controlled, high density crosslinking to achieve advanced composites.

BACKGROUND OF THE INVENTION

Recently, chemists have sought to synthesize oligomers for high performance advanced composites suitable for aerospace applications. These composites should exhibit solvent resistance; be tough, impact resistant, and strong; be easy to process, and be thermoplastic. Oligomers and composites that have thermo-oxidative stability, and, accordingly can be used at elevated temperatures, are particularly desirable.

While epoxy-based composites are suitable for many applications, their brittle nature and susceptibility to thermal or hydrolytic degradation make them inadequate for many aerospace applications, especially those applications which require thermally stable, tough composites. Accordingly, research has recently focused upon polyimide composites to achieve an acceptable balance between thermal stability, solvent resistance, and toughness. Still, the maximum temperatures for use of the polyimide composites, such as PMR-15, are about 600°–625° F., since they have glass transition temperatures of about 690° F. PMR-15 still suffers from brittleness.

There has been a progression of polyimide sulfone compounds systhesized to provide unique properties or combinations of properties. For example, Kwiatkowski and Brode synthesized maleic-capped linear polyarylimides as disclosed in U.S. Pat. No. 3,839,287. Holub and Evans synthesized maleic- or nadic-capped, imido-substituted polyester compositions as disclosed in U.S. Pat. No. 3,729,446. Lubowitz and Sheppard synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones, polybutadienesulfones, and "star" or "star-burst" multidimensional oligomers. These oligomers have surprisingly high glass transition temperatures yet reasonable processing and desirable physical properties.

Polybenzoxazoles (or heterocycle oligomers), such as those disclosed in U.S. Pat. Nos. 4,965,336 and 4,868,270, may be used at temperatures up to about 750°–775° F., since these composites have glass transition temperatures of about 840° F. Aerospace applications need composites which have even higher use temperatures while maintaining toughness, solvent resistance, ease of processing, formability, strength, and impact resistance.

Multidimensional oligomers, such as disclosed in U.S. Ser. No. 726,258, now abandoned; 810,817, now abandoned; and 000,605, now U.S. Pat. No. 5,210,213, are easier to process than some advanced composite oligomers since they can be handled at lower temperatures. Upon curing, however, the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined with well-known diluents, such as styrene, do not exhibit satisfactory thermal and oxidative resistance to be useful for aircraft or aerospace applications. Polyarylesters are often unsatisfactory, also, since the resins often are semicrystalline which may makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

Conductive and semiconductive plastics have been extensively studied (see, e.g., U.S. Pat. Nos. 4,375,427; 4,338,222; 3,966,987; 4,344,869; and 4,344,870). These prior art polymers do not possess the blend of properties which are essential for aerospace applications. That is, the conductive polymers do not possess the blend of (1) toughness, (2) stiffness, (3) elasticity, (4) ease of processing, (5) impact resistance and other matrix stress transfer capabilities, (6) retention of properties over a broad range of temperatures, and (7) high temperature resistance that is desirable on aerospace advanced composites. The prior art composites are often too brittle.

As described in copending application U.S. Ser. No. 726,259, now abandoned, (from which this application claims priority) high performance, aerospace advanced composites can be prepared using crosslinkable, end capped polyester imide ether sulfone oligomers that have the desired combined properties of solvent resistance, toughness, impact resistance, strength, ease of processing, formability, and thermal resistance. By including Schiff base (—CH=N—), imidazole, thiozole, or oxazole linkages in the oligomer chain (as disclosed here), the advanced composites formed with multidimensional oligomers can have semiconductive or conductive properties when appropriately doped.

Lockheed reportedly has developed conductive or semiconductive polyanalines.

Polyamide oligomers and blends are described in Lubowitz and Sheppard U.S. Pat. Nos. 4,876,328; 4,935,523; and 4,847,333 and polyetherimide oligomers and blends are described in U.S. Ser. No. 016,703, now U.S. Pat. No. 4,851,495.

Polyamideimides are generally injection-moldable, amorphous, engineering thermoplastics which absorb water (swell) when subjected to humid environments or immersed in water. Polyamideimides are generally described in the following patents: U.S. Pat. No. 3,658,938; U.S. Pat. Nos. 4,628,079; 4,599,383; 4,574,144; or 3,988,344. The thermal integrity and solvent-resistance can be greatly enhanced by capping amideimide backbones with monomers that present one or two crosslinking functionalities at each end of the oligomer, as described in Lubowitz and Sheppard application U.S. Ser. No. 092,740, now abandoned.

The present invention combines features of the "Schiff base" conductive sulfone polyarylesters with the "star" and "star-burst" multidimensional morphology to create advanced conductive composites.

SUMMARY OF THE INVENTION

The commercially available conductive or semiconductive polymers are usually intractable and infusible, and degrade at temperatures above about 100° C. Accordingly, they are unsatisfactory for most aerospace applications. Linear "Schiff base" polyesters, such as those described in U.S. Ser. No. 726,259, now abandoned, may have poor solubility and poor melt-flow characteristics, which would make them difficult to process into composites. Therefore, the present invention combines (1) the morphology behind the thermally stable, "star" or "star-burst" oligomers of U.S. Ser. No. 726,258, now abandoned with (2) relatively short polymeric arms of polyester or polyether "Schiff base" compounds, and with (3) crosslinking (i.e. unsaturated hydrocarbon) end caps to provide, upon doping, conductive or semiconductive oligomers with high use temperatures that are usable in specialized aerospace applications.

The preferred conductive, multidimensional oligomers generally are made by reacting (1) an aromatic hub, such as a compound of the general formula: ϕ—$X_3$ wherein X=—CHO, —OH, —$NH_2$,

or halogen, and ϕ=phenyl with (2) a corresponding mono- or difunctional crosslinkable end cap monomer of the general formula:

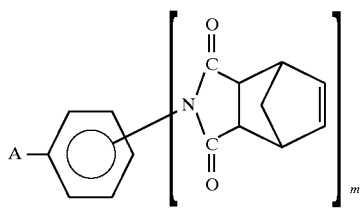

wherein A=X as defined for the hub, provided that if X=—CHO,

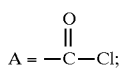

and m=1 or 2, and (3) with the appropriate mixture of diamines, aldehydes, and dialcohols (i.e. biphenols, diols, or dihydric phenols) to achieve "Schiff base" arms radiating from the hub.

Particularly preferred oligomers have the general formula:

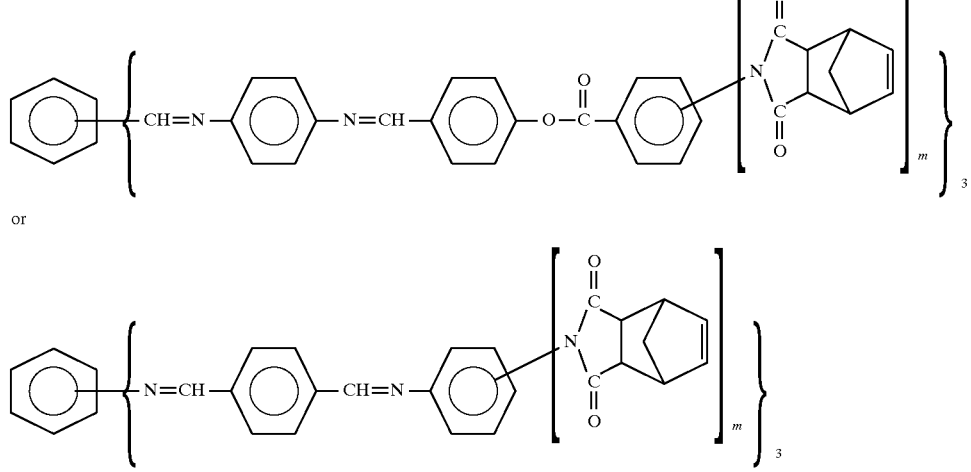

Of course, oligomers with more arms or longer arms might also be made.

Blends of the conductive, multidimensional oligomers and compatible, noncrosslinking polymers can also be made. The oligomers or blends can be processed into prepregs and cured to form advanced composites. The blends can include a Schiff base counterpart as the polymer, or a polymer from a different chemical family.

BEST MODE CONTEMPLATED FOR THE INVENTION

Thermally stable composites having semiconductive or conductive properties when doped with suitable dopants can be made using multidimensional oligomers of the general type described in U.S. Ser. No. 726,258, now abandoned. The linear arms of the oligomers in these conductive, multidimensional oligomers, however, contain Schiff base linkages (or other conductive linkages) between aromatic groups. Sulfone and ether linkages may be interspersed in the arms, as will be explained. Each arm is terminated with a mono- or difunctional end cap having one or two crosslinking sites to allow controlled, high density crosslinking upon heat-induced or chemically-induced curing. For example,

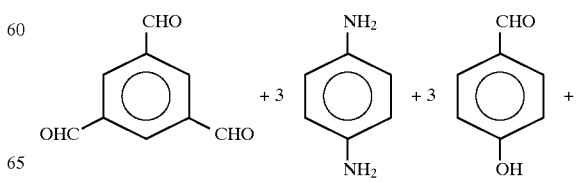

-continued

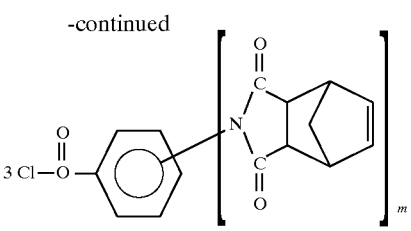

can be mixed and reacted under an inert atmosphere to yield:

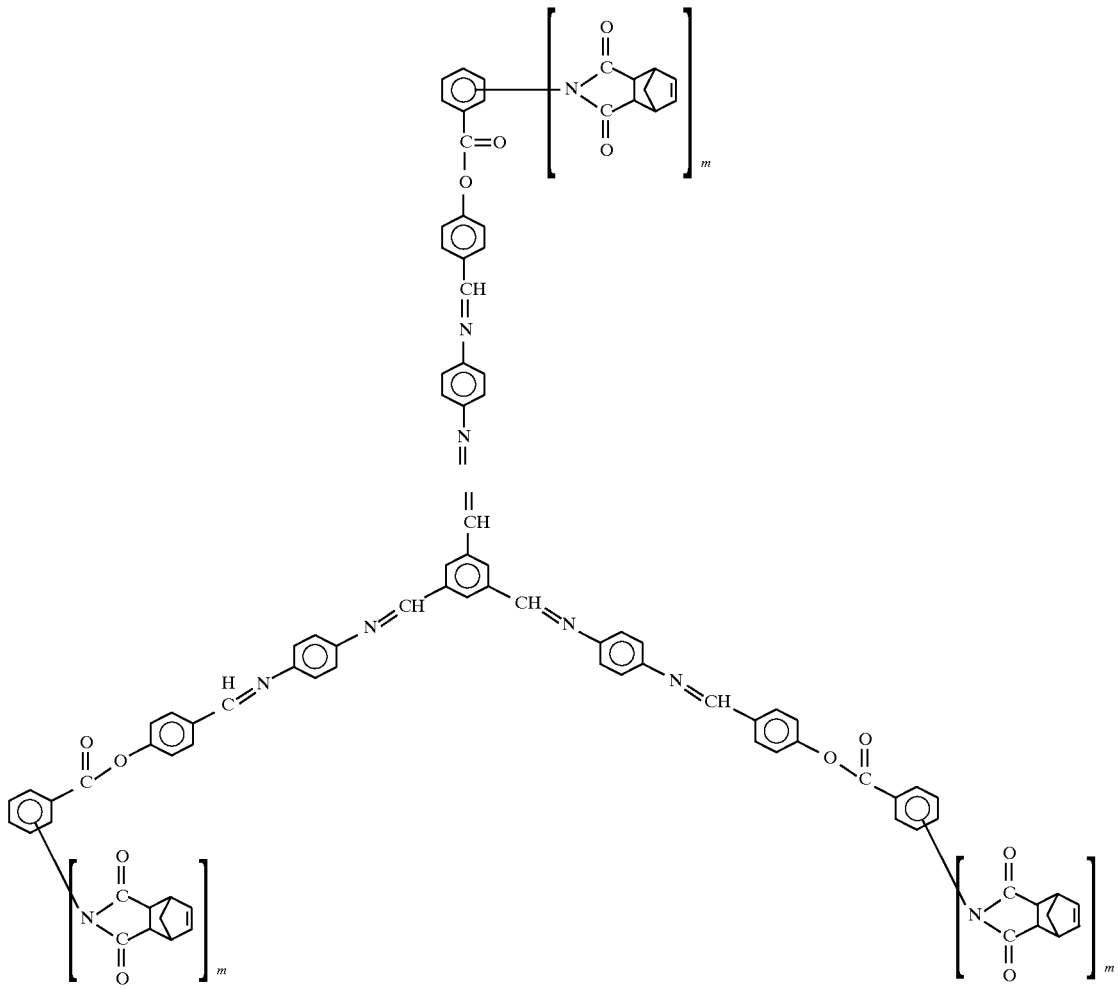

wherein m=1 or 2. Competing side reactions can be minimized by staging the reaction sequence rather than mixing all four reactants simultaneously.

In general terms, the present invention relates to a process and the products of the process for making "star" (m=1) or "star-burst" (m=2), conductive or semiconductive, multidimensional oligomers of this general type, and are usually formed using the amine/aldehyde condensation that yields Schiff (—CH=N—) linkages.

Thermally stable oligomers suitable for high temperature advanced composites are synthesized to include a high degree of aromatic groups. The stable aromatic bond energies allow synthesis of an oligomer with outstanding thermal stability. Additional toughness and impact resistance is obtained by including electronegative ("sulfone") linkages within the linear chains of aromatic groups that radiate from the central aromatic hub. The electronegative linkages are generically called "sulfone" linkages for purposes of this description, and include the groups —CO—; —SO$_2$—; —(CF$_3$)$_2$C—; and —S—. Generally, —CO— and —SO$_2$— groups are preferred for cost, convenience, and performance. The group —S—S— should be avoided, since it is too thermally labile.

The preferred aromatic groups in the chains are the common aryl groups, such as phenyl, biphenyl and naphthyl. Other aromatic groups can be used, if desired, since their stablized aromatic bonds should provide the desired thermal stability. For example, azaline groups may be used. The aryl groups may include substituents, if desired, such as halogen, lower alkyl up to about 4 carbon atoms, lower alkoxy up to about 4 carbon atoms, or aryl side chains. Steric hindrance may arise in synthesizing the oligomers or in crosslinking the oligomers into the final composites, if the side chains are too large. The substituents may also effect the thermal stability of the resulting oligomers and composites. Unsubstituted phenyl groups are preferred for cost, convenience, and performance.

Improved performance and thermal stability is gained through the multidimensional morphology. An aromatic hub includes a plurality of rays or spokes radiating from the hub in the nature of a star to provide multidimensional crosslinking with a greater number of crosslinking bonds than linear arrays alone through suitable terminal groups. Usually the hub will have three radiating chains to form a Y pattern, as earlier described. In some cases, four chains may be used. Including more chains leads to steric hindrance as the hub is too small to accommodate the radiating chains. A trisubstituted phenyl hub is highly preferred with the chains being symmetrically placed about the hub. Biphenyl, naphthyl, or azaline (i.e. melamine) may also be used as the hub along with other aromatic moieties, if desired, as will be known to those of ordinary skill.

Triazine derivatives can be used as the hub. These derivatives are described in U.S. Pat. No. 4,574,154 and have the general formula:

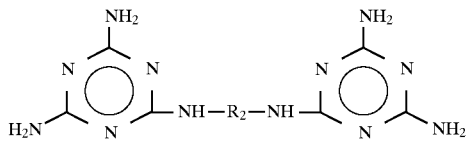

wherein $R_2$ is a divalent hydrocarbon residue containing 1–12 carbon atoms (and, preferably, ethylene). Corresponding polyacids or acid halides are described in U.S. Pat. No. 4,617,390, and may also be used.

Another class of hubs (aryletheramines) can be formed by reacting the corresponding halo-hub (such as tribromobenzene) with aminophenol to form triamine compounds represented by the formula:

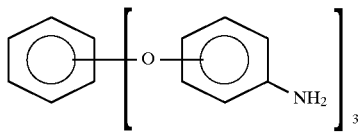

The aromatic hub may be a tris(hydroxyphenyl)-alkane of the formula:

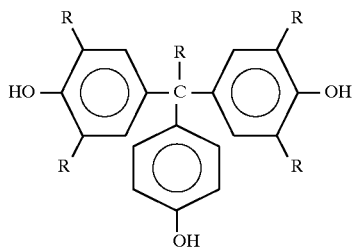

wherein R=hydrogen or methyl and can be the same or different, as described in U.S. Pat. No. 4,709,008.

Such trihydric phenolic compounds are made by reacting 4-hydroxybenzaldehyde or 4-hydroxyacetophenone with an excess of phenol under acidic conditions. Such trihydric phenols are disclosed in U.S. Pat. Nos. 3,579,542 and 4,394,496.

Other hubs include polyacids (or acid halides) of the formulae:

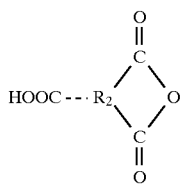

made by reacting polyols, such as phloroglucinol (which is shown) with nitrobenzoic acid or nitrophthalic acid. The nitrophthalic acid products have six acid functionalities. Amine-terminated hubs can be reacted with an acid anhydride of the formula:

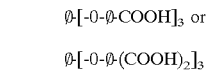

to form an acid hub. Here, $R_2$ preferable is phenyl. These acid hubs can then be reacted with a diamine to form chain-extended polyamine hubs. Alternatively, the acid (or acid halide) hub can be reacted with HO—ϕ—CHO to form a polyaldehyde hub. Thus, the oligomers can be made by the simultaneous condensation of the acid halide hub, the HO—ϕ—CHO (or a related compound having active —OH and —CHO functionalities), a diamine, and an acid halide end cap monomer. Of course, the polyaldehyde hub can be reacted directly with an imidophenylamine end cap monomer to form the conductive or semiconductive oligomer.

Polyol hubs can be reacted with nitroaniline to prepare chain-extended polyamine hubs. The oligomers from polyol hubs can be prepared, accordingly, by the simultaneous condensation of a mixture of the hub; nitroaniline; a dialdehyde, such as OHO—ϕ—CHO; and an imidophenylamine end cap monomer.

The acid or acid halide hubs can be reacted with phenylene diamine (or another diamine) to form an amino-terminated compound that can then be reacted with a dialdehyde and an amine end cap monomer. The four reactants can be mixed simultaneously to prepare the oligomers. Polyol hubs can be reacted with phthalic acid chloride (or another dicarboxylic acid halide), phenylene diamine (or another diamine), a dialdehyde, and an amine end cap monomer preferably in a sequential reaction of adding the diamine slowly to a mixture of the hub and dicarboxylic acid halide and subsequent addition of a mixture of the dialdehyde and end cap to the intermediate.

The chains of the multidimensional oligomers are terminated with hydrocarbon unsaturation that provides crosslinking end-cap groups. These end caps improve the solvent-resistance of the polymers and advanced composites, and further stabilize the composite. The end-cap groups may be thermally or chemically activated during the curing step to provide a strongly crosslinked, complex, multidimensional array of interconnected molecules. End caps with two crosslinking functionalities (difunctional end caps) are expected to yield the highest crosslinked arrays.

Each arm of the oligomer includes at least one conductive linkage, such as a Schiff base (—CH=N—) linkage, and chain extender portions, such as the phenyl groups illustrated in the example. By the proper combination of aldehydes, diamines, dialcohols and dicarboxylic acids or their halides, a family of conductive or semiconductive oligomers can be prepared.

The oligomers may be formed by the attachment of arms to the hub followed by chain termination in two steps. For example, phloroglucinol may be mixed with p-aminophenol and 4,4'-dibromodiphenylsulfone and reacted under an inert atmosphere at an elevated temperature to achieve an amino-terminated "star" of the general formula:

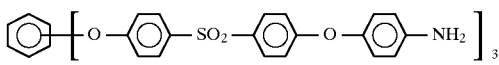

which can be reacted with the chain extenders and end caps to yield a suitable end capped oligomer. Those skilled in the art will recognize the generality of this synthetic pathway to achieve "stars" with extended conductive arms including phenoxyphenyl sulfone linkages interspersed with the conductive linkages.

The oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is generally preferred, resulting undoubtedly in a mixture of oligomers because of the complexity of the reactions. The products of the processes (even without distillation or isolation of individual species) are preferred oligomer mixtures which can be used without further separation to form the desired advanced composites. Homogeneous reaction seems to yield oligomers that cure to composites which have the highest solvent resistance.

Oligomers can also be synthesized from a mixture of four or more reactants. Adding components, however, adds to the complexity of the reaction and of its control. Undesirable competitive reactions may result or complex mixtures of macromolecules having widely different properties may be formed, because chain extenders and chain terminators are mixed, and compete against one another.

The selection of arms and end cap monomers can effect the thermal stability, toughness, ease of processing, impact resistance, and solvent resistance of the resulting oligomers and advanced composites formed with the cured oligomers. Longer arms may result in reduced thermal stability since the relative proportion of crosslinking bonds will be reduced, and the crosslinking bonds will be spaced farther apart. Since the end caps exhibit different thermal properties, they will undoubtedly impart different properties to the resulting composite. A wide variety of composites with different use ranges can be made, and are all considered to be within the class of compounds contemplated by this invention. To that end, the end caps include radicals selected from the group consisting of $Y_i$—R*— wherein Y=an unsaturated hydrocarbon residue including a segment selected from the group consisting of:

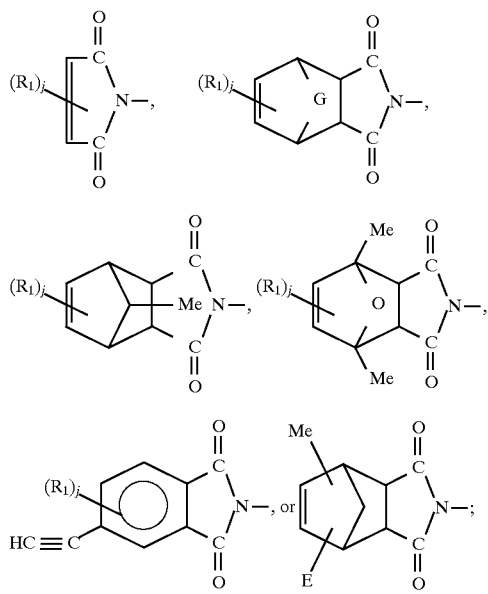

$R_1$=lower alkyl, aryl, substituted alkyl, substituted aryl (including hydroxyl or halo-substituents), lower alkoxy, aryloxy, halogen, or mixtures thereof (preferably lower alkyl);

G=—SO$_2$—, —S—, —O—, —CH$_2$—, —CO—, —SO—, —CHR—, or —CR$_2$—;

j=0, 1, or 2;

E=methallyl or allyl;

Me=methyl;

i=1 or 2;

R*=phenyl or pyrimidinyl; and

R=hydrogen, lower alkyl, or phenyl.

Other ethynyl, trimethylsilylethynyl, and phenylethynyl end groups may also be used, if desired. These end caps will probably allow curing at lower temperatures, however, and will probably produce composites of lower thermal stability.

Although wholly aryl backbones for the chains are preferred, aliphatic moieties, such as residues of the dianhydride MCTC, may be incorporated into the arms, if desired.

"Schiff base" is generally used in a generic way to represent the conductive linkages —CH=N—, oxazole, thiazole, or imidazole. True Schiff base compounds formed by the aldehyde/amine condensation are preferred.

Dopants for creating the semiconductive or conductive composites from the oligomers are preferably selected from compounds commonly used to dope other polymers, namely (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants react with the polymers to form charge transfer complexes. N-type semiconductors result from doping with alkali metal dispersions. P-type semiconductive result from doping with elemental iodine or perchlorates.

While research into conductive or semiconductive polymers has been intense, the resulting compounds (mainly polyacetylenes, polyphenelenes, and polyvinylacetylenes) are unsatisfactory for aerospace applications because the polymers are:

(a) unstable in air;

(b) unstable at high temperatures;

(c) brittle after doping;

(d) toxic because of the dopants; or (e) intractable.

These problems are overcome or significantly reduced with the conductive oligomers of the present invention.

The composites of the present invention generally exhibit greater oxidative stability and greater dimensional stability at elevated temperatures, greater impact strengths, greater dimensional stiffness over a wider range of temperatures, and greater toughness than prior art conductive composites.

While conventional theory holds that semiconductive polymers should have (1) low ionization potentials, (2) long conjugation lengths, and (3) planar backbones, there is an inherent trade-off between conductivity and toughness or processibility, if these constraints are followed. To overcome the processing and toughness shortcomings common with Schiff base, oxazole, imidazole, or thiazole polymers, the oligomers of the present invention, often also include "sulfone" linkages interspersed along the backbone providing a mechanical swivel for the rigid, conductive segments of the arms. Phenoxyphenylsulfone or phenoxyphenylketone moieties are preferred. The resulting compounds are polyphenoxyphenylsulfoneimide oligomers with conductive segments.

Preferred Schiff base segments for the arms have the general formula:

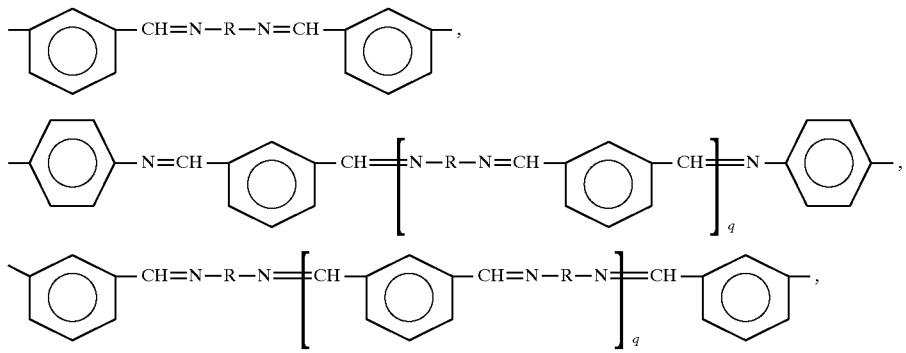

wherein R=an aromatic moiety (i.e. phenyl) or a short aryl chain including a plurality of aryl moieties linked with any of —$CH_2$—, —$SO_2$—, —S—, —O—, —CO—, —$(CH_3)_2C$—, or —$(CF_3)_2C$—, and q=0–4.

R is generally selected from the group consisting of:
  phenyl;
  biphenyl;
  naphthyl; or
  a compound of the general formula:

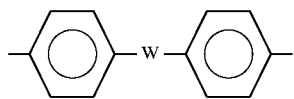

wherein W=—$CH_2$—, or —$SO_2$—; and q=0–4.

Because it may be difficult to make precursor molecules having intermediate benzimidazole, benzoxazole, or benzothiazole linkages, and because the chemistry for Schiff base (—CH=N—) compounds is well understood, it is preferred to use —CH=N— linkages in the oligomers for semiconductive or conductive applications.

Solubility of the oligomers becomes an increasing problem as the length of the chains increases. Therefore, shorter chains are preferred, if the resulting composites remain thermoplastic. That is, the chains should be long enough to yield thermoplastic characteristics but short enough to keep the oligomers soluble during the reaction sequence.

The reactive aldehydes, diamines, dialcohols (e.g., dihydric phenols or diols), or dicarboxylic acid halides may have backbones of the following general nature and may be combined in many ways to form oligomers of the general class of interest:

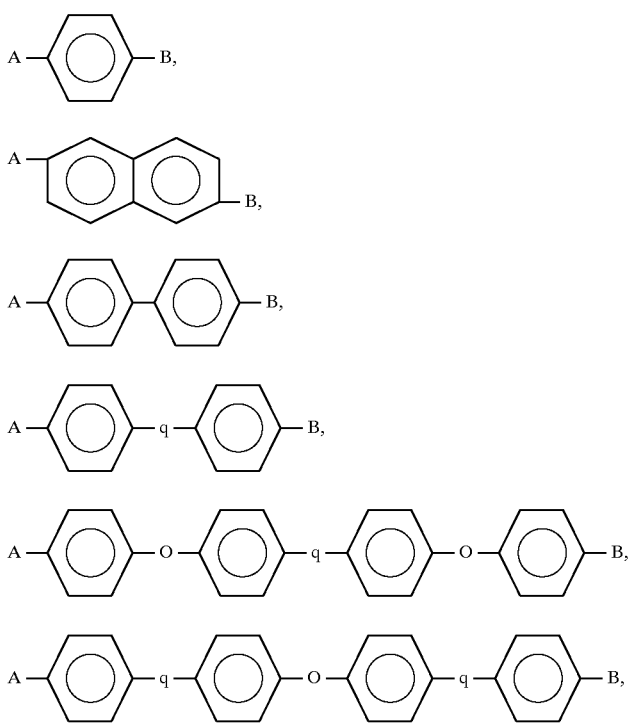

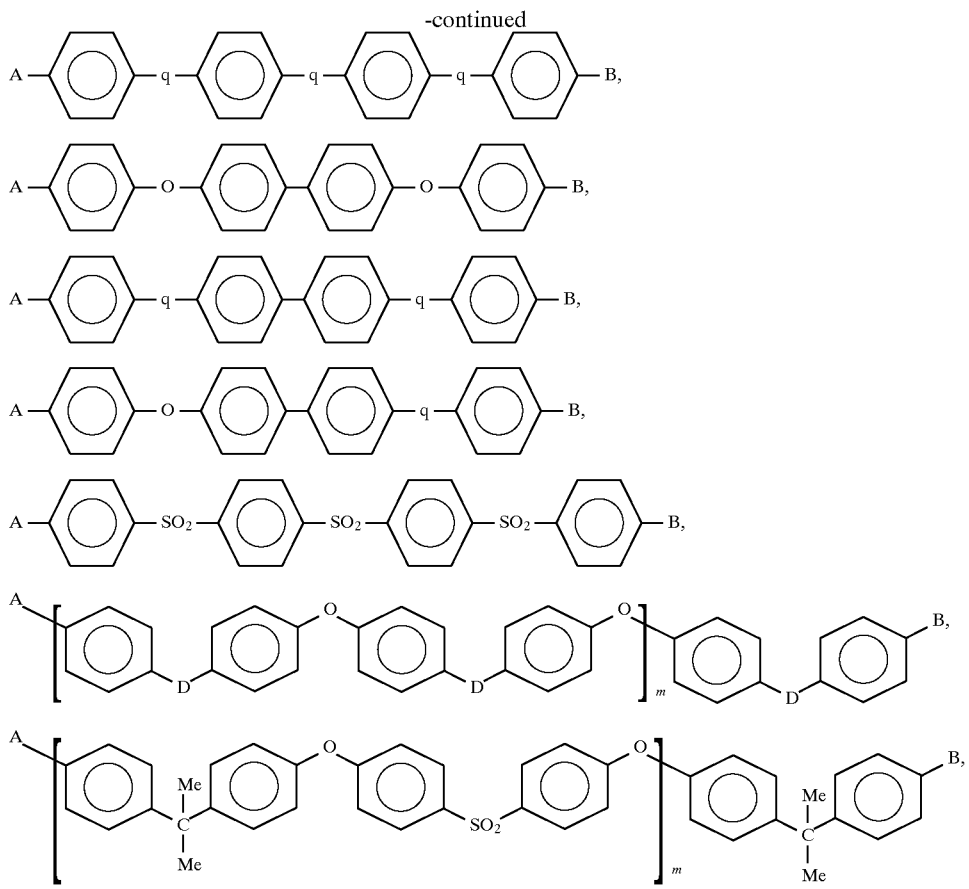

or $$-\overset{O}{\underset{\|}{C}}-X;$$

wherein q=—SO$_2$—, —CO—, —S—, or —(CF$_3$)$_2$C—, and preferably —SO$_2$— or —CO—;

Me=methyl;

m=an integer, generally less than 5, and preferably 0 or 1;

D=any of —CO—, —SO$_2$—, or —(CF$_3$)$_2$C—;

A=—CHO, —NH$_3$, —OH, or $$-\overset{O}{\underset{\|}{C}}-X,$$

B=—CHO, —NH$_3$, —OH, or

A-ϕ-O-[-R$^1$-O-R$^{11}$-O-]-R$^1$-O-ϕ-B

X=halogen

ϕ=phenyl;

R$^1$=—ϕ—q—ϕ—;

R"=—ϕ—, naphthyl, biphenyl, —ϕ—q—ϕ—, —ϕ—O—ϕ—, or —ϕ—C(CF$_3$)$_2$—O—; and q=—SO$_2$—, —CO—, —S—, or —(CF$_3$)$_2$C—.

Generally A=B, but suitable reactants include those compounds in which either A or B is —CHO and the other end group is —OH.

The Schiff base linkages in the arms are generally formed by the condensation of an aldehyde with an amine. For example, ϕ-(—CHO)$_3$ can be condensed with Y$_i$—ϕ—NH$_2$ to form multidimensional oligomers of the general formula:

ϕ-[—CH=N-ϕ-Y$_i$]$_3$ wherein ϕ, i, and Y are as previously defined. Other oligomers of this same type, can be prepared as illustrated by the following hypothetical examples.

EXAMPLE 1

A preferred oligomer is prepared by reacting:

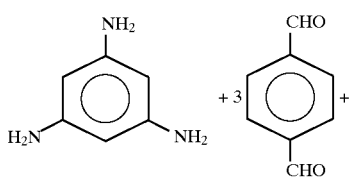

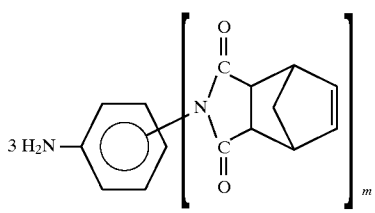

under an inert atmosphere to yield:

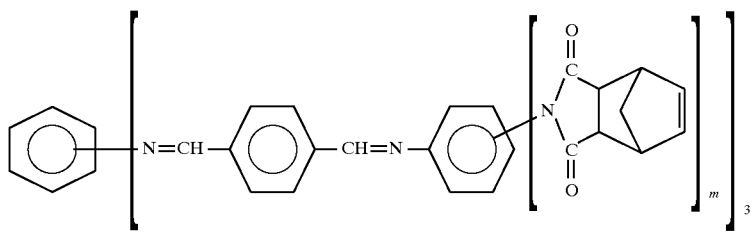
Oligomers of this general type are preferred because the starting materials are easily obtained and are inexpensive.
EXAMPLE 2
Another preferred oligomer is prepared by reacting:
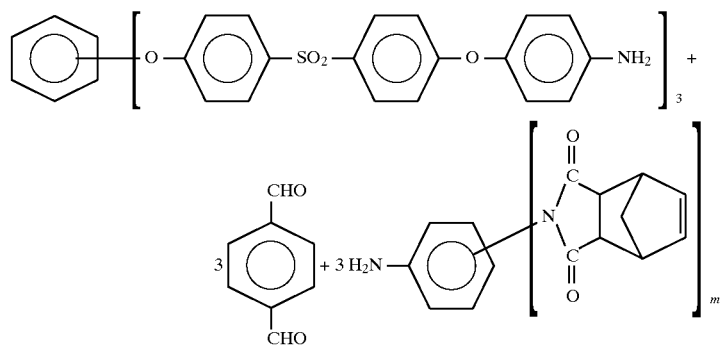
under an inert atmosphere to yield:
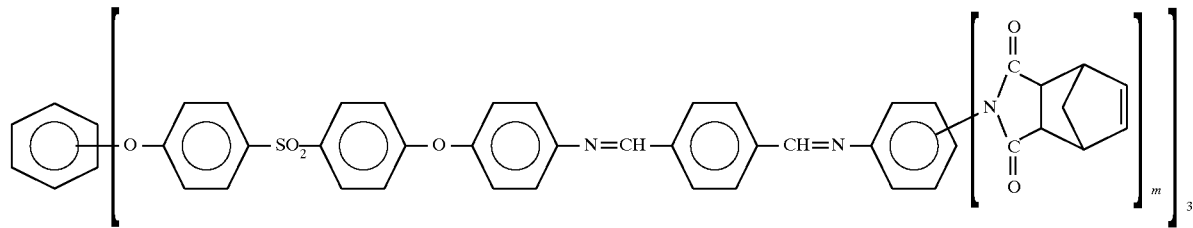
EXAMPLE 3
Another preferred oligomer is prepared by reacting:
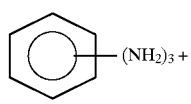
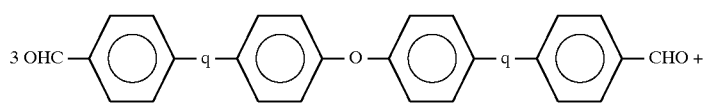

-continued
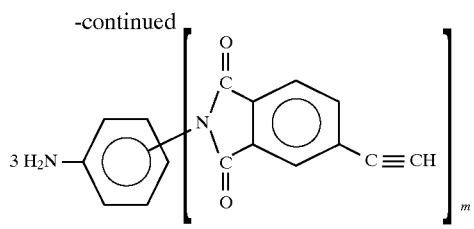
under an inert atmosphere to yield:
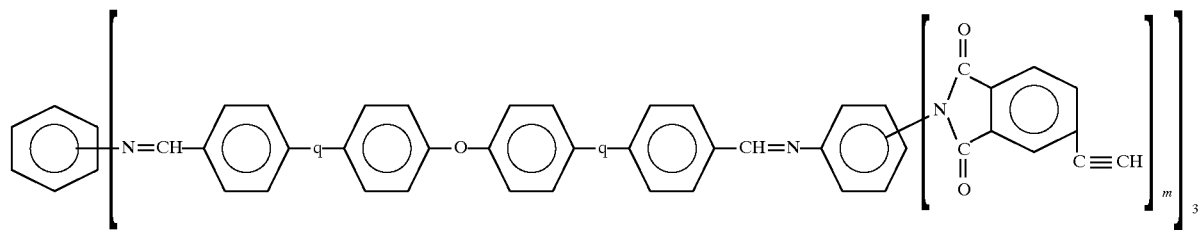
wherein q=—SO$_2$—, —CO—, —S—, or —(CF$_3$)$_2$C—, and, preferably, —SO$_2$— or —CO—
EXAMPLE 4
Another preferred oligomer is prepared by reacting:
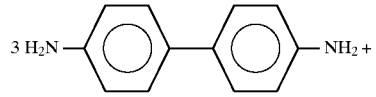
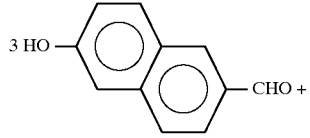
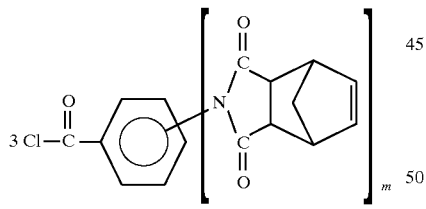
under an inert atmosphere to yield:
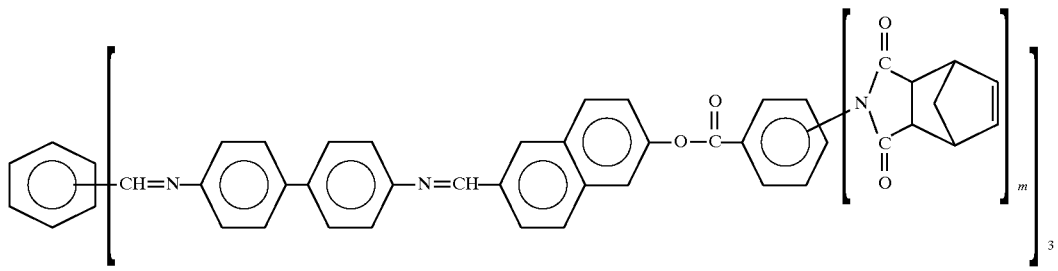

EXAMPLE 5

Yet another preferred oligomer is prepared by reacting:

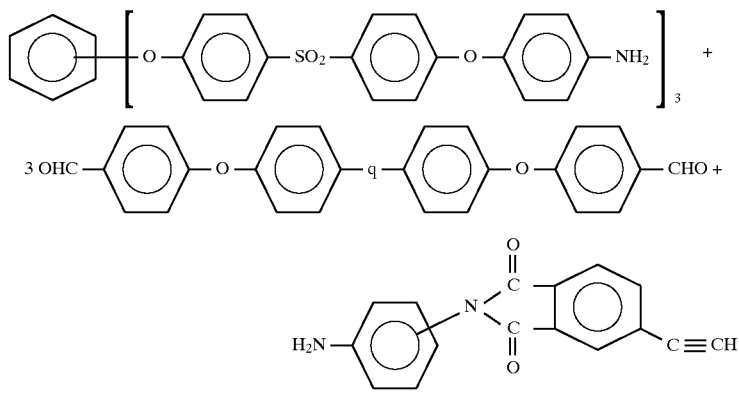

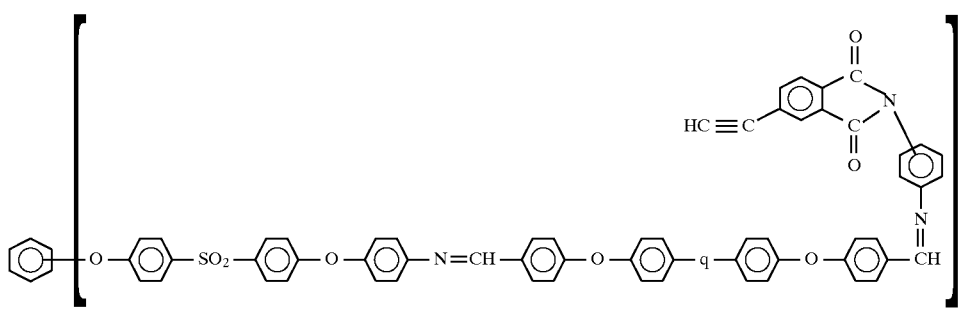

under an inert atmosphere to yield:

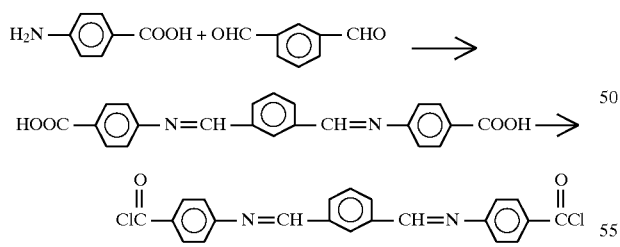

wherein q=—SO$_2$—, —CO—, —S—, or —(CF$_3$)$_2$C—, and preferably —SO$_2$— or —CO—.

From these hypothetical examples, those skilled in the art will recognize the generality of the syntheses and will recognize the family of oligomers contemplated by the invention.

The syntheses illustrated in the Examples are preferred for simplicity, convenience, cost, and anticipated yield.

Schiff base dicarboxylic acids and diacid halides can be prepared by the condensation of aldehydes and aminobenzoic acid (or other amine acids) in the general reaction scheme:

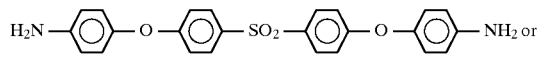

or similar schemes. These dicarboxylic acid halides can be reacted with polyol hubs and an imidophenol end cap to form ester/Schiff base oligomers or with polyamine hubs and an imidophenylamine hub to form amide/Schiff base oligomers.

Other diamines that may be used, but that are not preferred, include those described in U.S. Pat. Nos. 4,504,632; 4,058,505; 4,576,857; 4,251,417; and 4,215,418. The aryl or polyaryl "sulfone" diamines previously described are preferred, since these diamines are soluble in conventional synthetic solvents and provide high thermal stability to the resulting oligomers and composites The diamines may include "Schiff base" conductive linkages (particularly —N=CH—), analogous to the diacid halides previously described.

Particularly preferred ethersulfone (i.e. phenoxyphenyl sulfone) diamines are those in which R$^1$ is

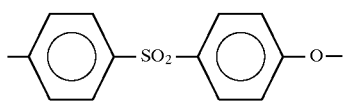

and R" is

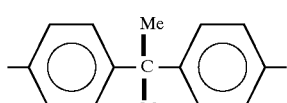

so that the phenoxyphenyl sulfone diamines include:

H$_2$N—⬡—O—⬡—SO$_2$—⬡—O—⬡—NH$_2$ or

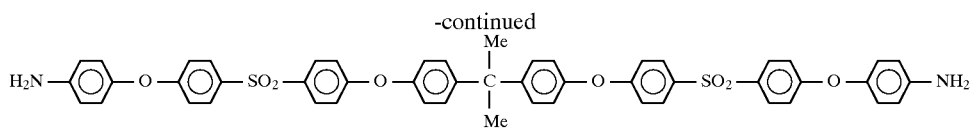

The molecular weights of these diamines varies from about 500 to about 2000. Using lower molecular weight diamines seems to enhance the mechanical properties of the difunctional polyamideimide oligomers, each of which has alternating ether "sulfone" segments in the backbone.

Phenoxyphenyl sulfone diamines of this general nature can be prepared by reacting two moles of aminophenol with (n+1) moles of an aryl radical having terminal, reactive halofunctional groups (dihalogens), such as 4,4'-dichlorodiphenylsulfone, and a suitable bisphenol (i.e., dialcohol, dihydric phenol, or diol). The bisphenol is preferably selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;

or mixtures thereof, as disclosed in U.S. Pat. No. 3,262,914. Bisphenols having aromatic character (i.e., absence of aliphatic segments), such as bisphenol-A, are preferred.

The dihalogens in this circumstance preferably are selected from the group consisting of:

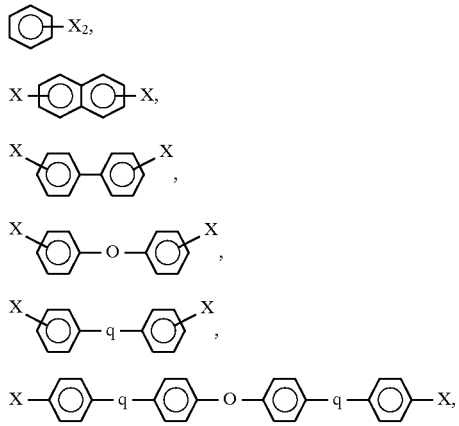

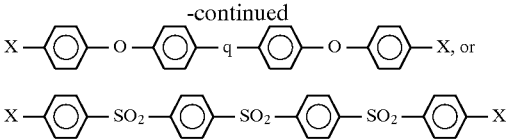

wherein X=halogen, preferably chlorine; and
q=—S—, SO$_2$—, —CO—, —(CH$_3$)$_2$C—, and —(CF$_3$)$_2$C—, and preferably either —SO$_2$—or —CO—.

The condensation reaction creates ether diamines that ordinarily include intermediate "sulfone" linkages. The condensation generally occurs through a phenate mechanism in the presence of K$_2$CO$_3$ or another base in a DMSO/toluene solvent. The grain size of the K$_2$CO$_3$(s) should fall within the 100–250 ANSI mesh range.

Additional methods for preparing phenoxyphenysulfones of this general type are disclosed in U.S. Pat. Nos. 3,839,287 and 3,988,374.

The diacid halide or dicarboxylic acid (i.e. dibasic acid) may include an aromatic chain segment selected from the group consisting of:

(a) phenyl; (b) naphthyl; (c) biphenyl;
(d) a polyaryl "sulfone" divalent radical of the general formula:

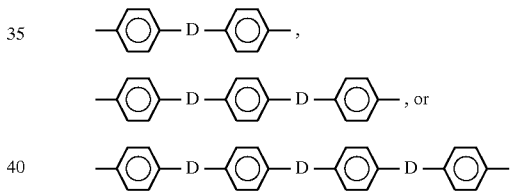

wherein D=—S—, —O—, —CO—, —SO$_2$—, —(CH$_3$)$_2$C—, —(CF$_3$)$_2$C—, or mixtures thereof throughout the chain; or (e) a divalent radical of the general formula:

wherein R$^1$=a C$_2$ to C$_{12}$ divalent aliphatic, alicyclic, or aromatic radical, and, preferably, phenyl (as described in U.S. Pat. No. 4,556,697).

Other diacid halides that can be used, but that are not preferred, are disclosed in U.S. Pat. No. 4,504,632, and include:
adipylchloride,
malonyl chloride,
succinyl chloride,
glutaryl chloride,
pimelic acid dichloride,
suberic acid dichloride,
azelaic acid dichloride,
sebacic acid dichloride, dodecandioic acid dichloride,
phthaloyl chloride,
isophthaloyl chloride,
terephthaloyl chloride,
1,4-naphthalene dicarboxylic acid dichloride, and
4,4'-diphenylether dicarboxylic acid dichloride.

Usually a Schiff base acid chloride will be reacted with a triamine hub and an imidophenylamine end cap monomer to form the conductive or semiconductive oligomers of the present invention. Alternatively, HO—ϕ—CHO, a triamine hub and an acid halide end cap monomer can be condensed.

A dialdehyde can be prepared by reacting 2 moles of HO—ϕ—CHO with an acid halide. The dialdehyde can be condensed then with a triamine hub and an imidophenylamine end cap monomer.

A trialdehyde hub can also be condensed with aminophenol or phenyl diamine and with an acid halide end cap monomer.

The pyrimidinyl radicals are commonly used for —OH end cap monomers formed by reacting anhydrides with

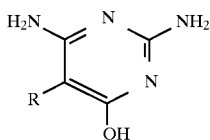

as described in U.S. Pat. No. 4,980,481. These —OH pyrimidines or their phenolic equivalents can be condensed with the Schiff base diacid halides using either a polyamine or polyol hub.

Oligomers of the present invention can also be made by reacting an aldehyde hub with an aminophenol (including those compounds described by Dai in U.S. Pat. No. 4,720, 584) and with an acid halide end cap monomer.

Prepregs and advanced composites can be readily prepared from the oligomers by conventional techniques. For example, the oligomers can be applied to a fiber cloth reinforcement, and the resulting prepreg can be cured in a vacuum bag process at an elevated temperature. The dopant should be added to the oligomer prior to prepreging. While woven fabrics are the typical reinforcement in prepregs, the reinforcing fibers can be continuous or discontinuous (in chopped or whisker form) and may be ceramic, organic, carbon (graphite), or glass, as suited for the desired application.

The oligomers and blends can also be used as adhesives, varnishes, films, or coatings, although doped composites are the preferred use.

Blends can improve impact resistance of composites prepared from the crosslinkable oligomers without causing a significant loss of solvent resistance. The blends comprise mixtures of one or more crosslinkable oligomers and one or more polymers that are incapable of crosslinking. The polymer may be from the same chemical family as the oligomer (i.e. be a Schiff base) or may be from a different chemical family (such as amide, ester, ether, etc.). Use of a conductive polymer is preferred. The blends generally comprise substantially equimolar amounts of one polymer and an oligomer having substantially identical backbones (when the oligomer is cured). The crosslinkable oligomer and comparable polymer can be blended together by mixing mutually soluble solutions of each. While the blend is preferably substantially equimolar in the oligomer and polymer, the ratio of the oligomer and polymer can be adjusted to achieve the desired physical properties.

Although the polymer in the blend usually has the same length backbone as the oligomer, the properties of the composite formed from the blend can be adjusted by altering the ratio of formula weights for the polymer and oligomer. The oligomer and polymer generally have substantially identical repeating units, but the oligomer and polymer merely need be compatible in the solution prior to sweeping out as a prepreg. Of course, if the polymer and oligomer have identical backbones, compatibility in the blend is more likely to occur.

Quenching compounds can be employed, if desired to regulate the polymerization of the compatible polymer, so that it has an average formula weight substantially identical with the cured (i.e. crosslinked) oligomer. For thermal stability, an aromatic quenching compound, such as aniline, is preferred.

Solvent resistance may decrease markedly if the comparable polymer is provided in large excess to the crosslinkable oligomer in the blend.

The blends may include multiple oligomers or multiple polmers, such as a three component mixture of an Schiff base oligomer, an amide oligomer, and an ester polymer.

The blends may yield semi-interpenetrating networks of the general type described by Egli et al. "Semi-Interpenetrating Networks of LARC-TPI" available from NASA- Langley Research Center.

Although the Para isomer is primarily illustrated throughout this description, other isomers may be used. The highest thermal stabilities appear to be achievable with unsubstituted phenyl chains of short length when these chains are capped with difunctional end caps.

While preferred embodiments have been described, those skilled in the art will readily recognize alterations, variations, and modifications which might be made without departing from the inventive concept. Therefore, the claims should be interpreted liberally with the support of the full range of equivalents known to those of ordinary skill based upon this description. The examples are given to illustrate the invention and not to limit it. The claims should be limited only as is necessary in view of the pertinent prior art.

We claim:

1. An oligomer that is useful for preparing a conductive or semiconductive composite when suitably doped with a conventional dopant, comprising an aromatic hub having at least three arms radiating from the hub, each arm being essentially a polyaryl chain including at least one conductive linkage selected from the group consisting of Schiff bases (—CH=N—), oxazoles, thiazoles, and imidazoles and including terminal crosslinking end caps selected from the group consisting of wherein:

Y$_i$—R*—

Y=an unsaturated hydrocarbon residue including a segment selected from the group consisting of:

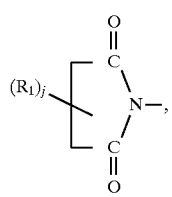

-continued

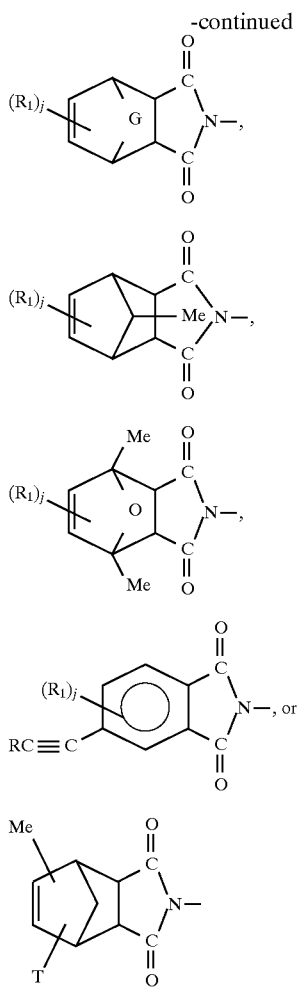

R$_1$=lower alkyl, aryl, substituted alkyl, substituted aryl, lower alkoxy, aryloxy, halogen, or mixtures thereof;
G=—SO$_2$—, —S—, —O—, —CH$_2$—, —CHR—, —CR$_2$—, —SO—, or —CO—;
j=0, 1, or 2;
T=methallyl or allyl;
Me=methyl;
R*=-ϕ- or pyrimidinyl;
ϕ=phenyl;

i=2; and
R=hydrogen, lower alkyl, or phenyl.

2. The oligomer of claim 1 wherein the conductive linkage is a Schiff base.

3. The oligomer of claim 1 wherein the conductive linkage is selected from the group consisting of benzoxazole, benzimidazole, and benzothiazole.

4. A blend comprising the oligomer of claim 1 and a compatible, noncrosslinking polymer.

5. A prepreg comprising the oligomer of claim 1 and a reinforcing additive in fiber or particulate form.

6. The oligomer of claim 1 wherein the hub is phenyl.

7. The oligomer of claim 1 wherein the oligomer has three arms.

8. The oligomer of claim 1 wherein the end cap is selected from the group consisting of:

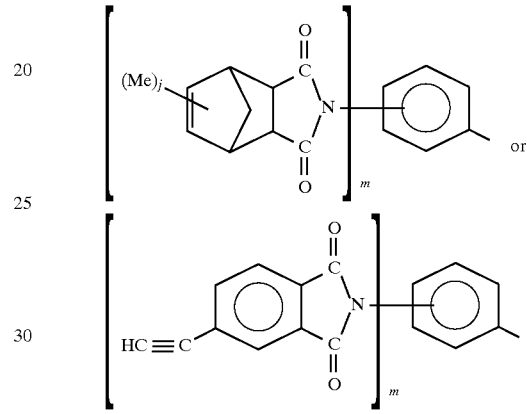

wherein Me=methyl; m=1 or 2; and j=0, 2.

9. The prepreg of claim 5 further comprising an effective amount of a dopant in the oligomer, the dopant being selected from the group consisting of alkali metals, alkali perchlorates, arsenic compounds, elemental halogens, and mixtures thereof.

10. A composite comprising the cured prepreg of claim 9.

11. A prepreg comprising the blend of claim 4, an effective amount of a dopant to make the oligomer conductive or semiconductive, and a reinforcing additive in fiber or particulate form.

12. A composite formed by curing the prepreg of claim 11.

13. An oligomer having a structural formula is selected from the group consisting of:

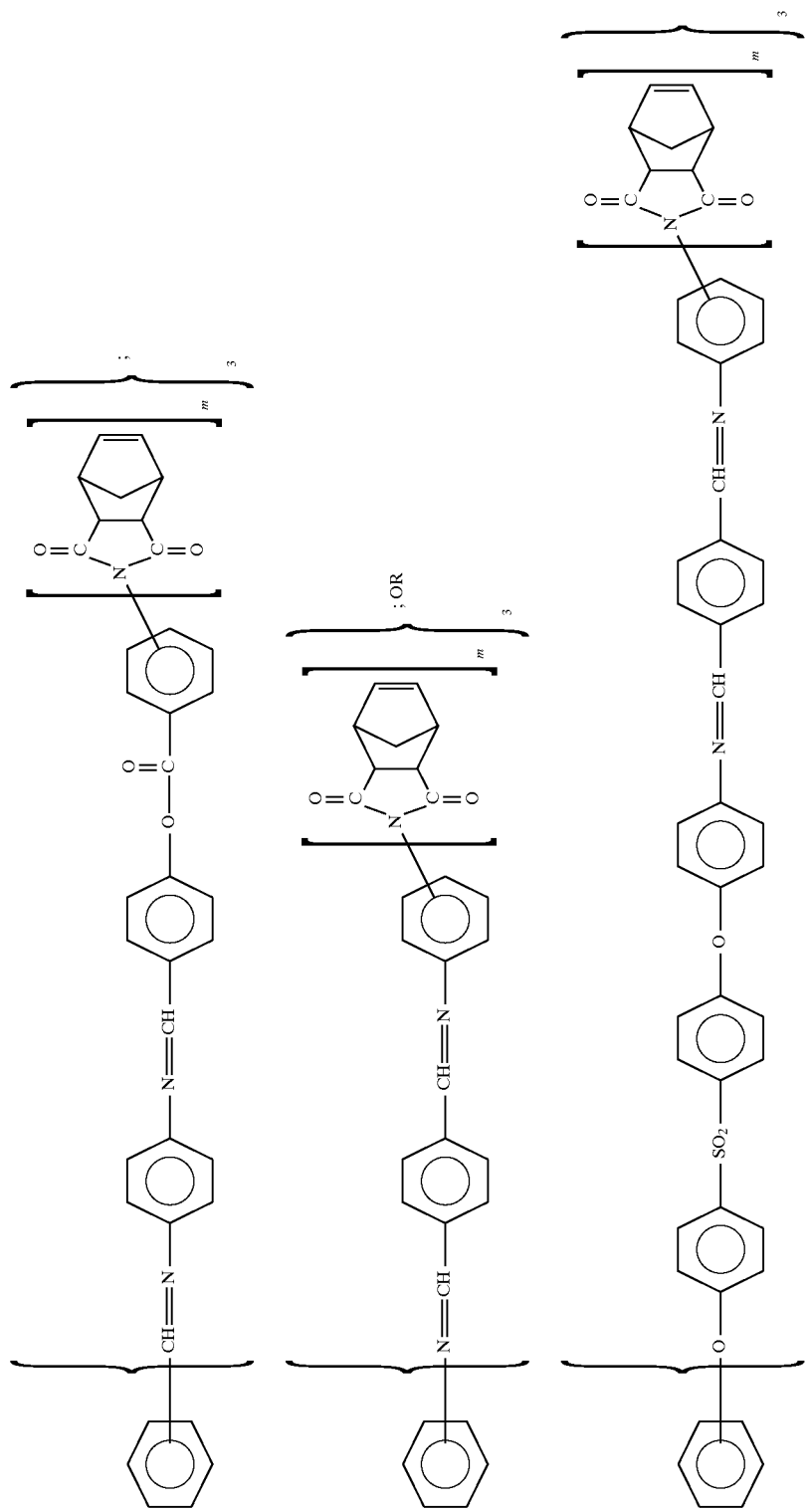

wherein m=1 or 2.

14. An oligomer that is useful for preparing a conductive or semiconductive composite when suitably doped with a conventional dopant, comprising the product of the process of simultaneously condensing an aryl compound having three aldehyde functionalities with an aryl or polyaryl diamine having a formula weight of less than about 1000 and two terminal amine functionalities, with an aryl or polyaryl moiety having a formula weight of less than about 1000 and having two terminal aldehyde functionalities, and with an acid halide, crosslinking end cap phenylimide.

15. A prepreg comprising the product of claim 14, an effective amount of a dopant, and a reinforcing additive in fiber or particulate form.

16. The product of the process entailing:

simultaneously condensing about one mole of an aromatic hub of the general formula:

wherein Ar=an aromatic radical of valency k;
X=—CHO, —OH, —NH$_2$,

or halogen; and
k=3 or 4, with at least three moles of a corresponding mono- or difunctional crosslinkable end cap monomers selected from the group of compounds having the general formula $Y_i$-R*-B wherein:

Y=an unsaturated hydrocarbon residue including a segment selected from the group consisting of:

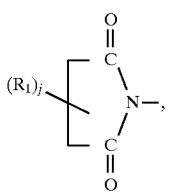

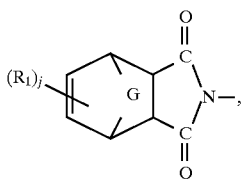

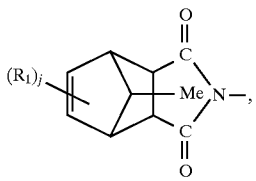

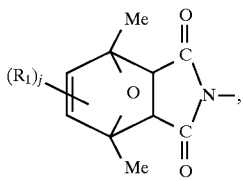

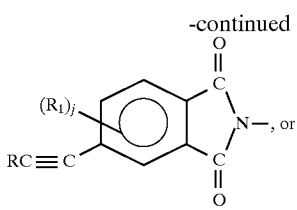

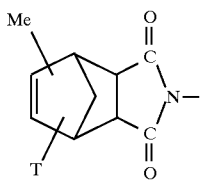

$R_1$=lower alkyl, aryl, substituted alkyl, substituted aryl, lower alkoxy, aryloxy, ahogen, or mixtures thereof;
G=—SO$_2$—, —S—, —O—, —CH$_2$—, —CHR—, —CR$_2$—, —CO—, or —SO—;
j=0, 1, or 2;
T=methallyl or allyl;
Me=methyl;
R*=—ø— or pyrimidinyl;
ø=phenyl;
i=1 or 2;
R=hydrogen, lower alkyl, or phenyl; and
B=—CHO, —OH—, —NH$_2$,

or halogen,
and with at least 3 moles of a solution containing a diamine, aldehyde, or mixture thereof under an inert atmosphere to form a compound having at least three arms, provided that each arm includes at least one Schiff base (—CH=N—) linkage to impart conductive or semiconductive properties when the product is suitably doped.

17. The product of the process entailing:
(a) mixing one mole of

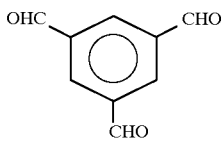

with about three moles of

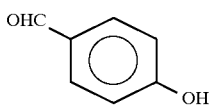

about three moles of

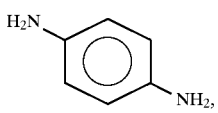

about three moles of

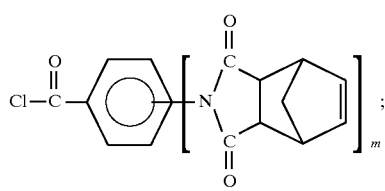

(b) reacting the mixture under an inert atmosphere.

18. The product of the process entailing:
condensing an aromatic polyaldehyde of the formula

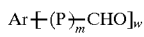

wherein P=a divalent aromatic organic;
Ar=an aromatic radical of valency w;
w=a small integer greater than or equal to 3; and
m=a small integer from 0–5;
with an imidophenylamine of the general formula $Y_1$—∅—$NH_2$ wherein:

Y=an unsaturated hydrocarbon residue including a segment selected from the group consisting of:

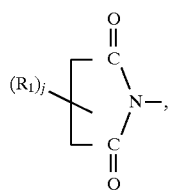

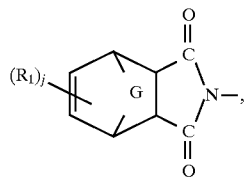

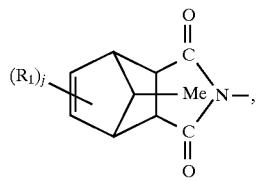

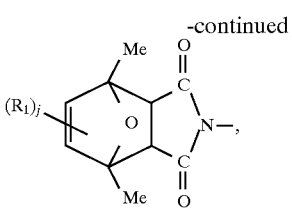

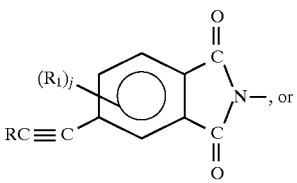

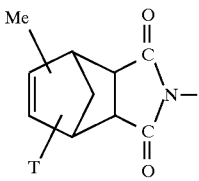

$R_1$=lower alkyl, aryl, substituted alkyl, substituted aryl, lower alkoxy, aryloxy, halogen, or mixtures thereof;
G=—$SO_2$—, —S—, —O—, —$CH_2$—, —CHR—, —$CR_2$—, —SO—, or —CO—;
j=0, 1, or 2;
E=methallyl or allyl;
Me=methyl;
i=1 or 2;
∅=phenyl; and
R=hydrogen, lower alkyl, or phenyl.

19. A prepreg comprising the product of claim 18, an effective amount of a dopant, and a reinforcing additive in fiber or particulate form.

20. The product of claim 18 further comprising a compatible, noncrosslinking polymer.

21. A prepreg comprising the product of claim 20, an effective amount of a dopant, and a reinforcing additive in fiber or particulate form.

22. The product of the process entailing:
simultaneously condensing (a) an aromatic hub of the general formula: Ar—$(NH_2)_w$
wherein:
Ar=an aromatic radical of valency w; and
w=an integer greater than or equal to 3,
with (b) a dicarboxylic acid halide that includes at least one divalent radical selected from the group consisting of:

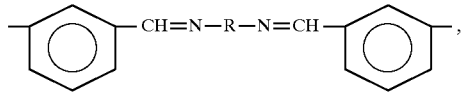

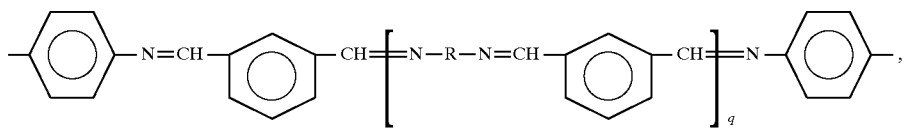

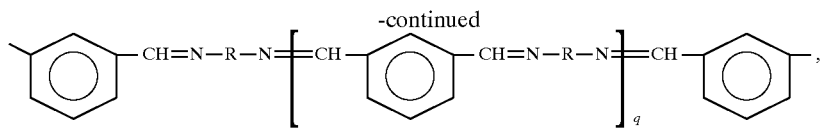

wherein R=a divalent hydrocarbon radical; and q=0–4, and
with (c) an end cap monomer of the general formula:

wherein:
i=2;
R*=phenyl or pyrimidinyl;
B=—OH or —NH$_2$;
Y=an unsaturated hydrocarbon residue including a segment selected from the group consisting of:

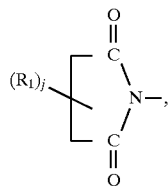

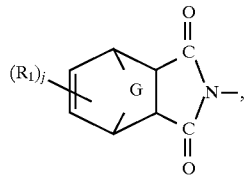

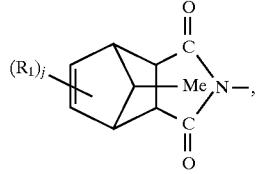

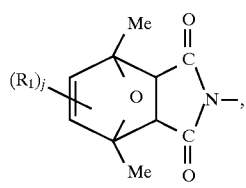

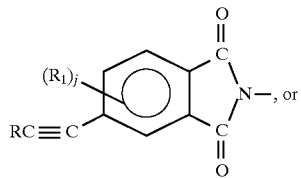

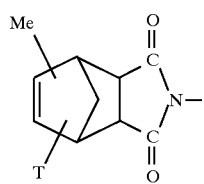

$R_1$=lower alkyl, aryl, substituted alkyl, substituted aryl, lower alkoxy, aryloxy, halogen, or mixtures thereof;

G=—SO$_2$—, —S—, —O—, —CH$_2$—, —CHR—, —CR$_2$—, —SO—, or —CO—;
j=0, 1, or 2;
E=methallyl or allyl;
Me=methyl;
i=1 of 2;
θ=phenyl; and
R=hydrogen, lower alkyl, or phenyl.

23. An oligomer that is useful for preparing a conductive or semiconductive composite when suitably doped with a conventional dopant, comprising an aromatic hub having at least three arms radiating from the hub, each arm being essentially a polyaryl chain including at least one conductive linkage selected from the group consisting of Schiff bases (—CH=N—), oxazoles, thiazoles, and imidazoles and including terminal crosslinking end caps selected from the group consisting of Y$_i$—R*— wherein: Y=an unsaturated hydrocarbon residue including a segment selected from the group consisting of:

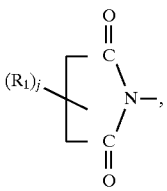

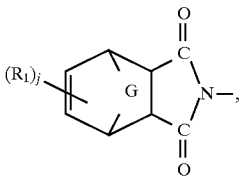

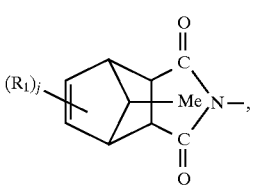

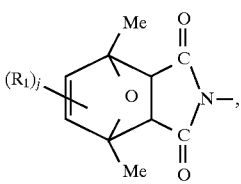

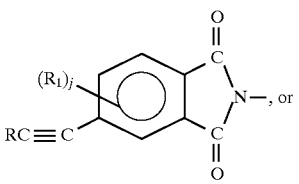

-continued

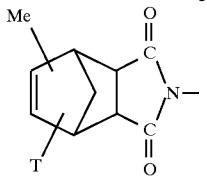

$R_1$=lower alkyl, aryl, substituted alkyl, substituted aryl, lower alkoxy, aryloxy, halogen, or mixtures thereof;
G=—SO$_2$—, —S—, —O—, —CH$_2$—, —CHR—, —CR$_2$—, —SO—, or —CO—;
j=0, 1, or 2;
T=methallyl or allyl;
Me=methyl;
R*=—⌽— or pyrimidinyl;
⌽=phenyl;
i=1 or 2; and
R=hydrogen, lower alkyl, or phenyl,
the oligomer being the product of condensing the aromatic hub with at least one reactive monomer to define the polyaryl chain and the reactive monomer in turn with an end capping monomer of the formula Y$_i$—R*—B wherein B=—NH$_2$, —COX, or —OH and X=halogen.

24. A blend comprising the oligomer of claim 23 and a compatible, noncrosslinking polymer.

25. A prepreg comprising the oligomer of claim 23 and a reinforcing additive in fiber or particulate form.

* * * * *